Figure 1:
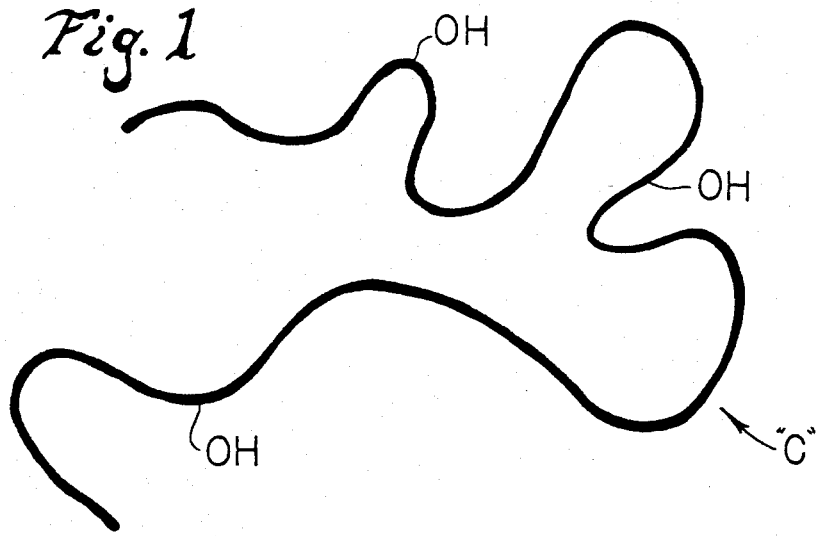

United States Patent [19]

Rubens

[11] Patent Number: 4,532,264
[45] Date of Patent: Jul. 30, 1985

[54] BETTER FOAMABLE STYRENE AND OTHER OLEFIN POLYMER COMPOSITIONS

[75] Inventor: Louis C. Rubens, Midland, Mich.

[73] Assignee: The Dow Chemical Company, Midland, Mich.

[21] Appl. No.: 604,688

[22] Filed: Apr. 27, 1984

Related U.S. Application Data

[62] Division of Ser. No. 545,316, Oct. 24, 1983, , which is a division of Ser. No. 256,758, Apr. 23, 1981, Pat. No. 4,448,933.

[51] Int. Cl.$^3$ ................................................ C08J 9/00
[52] U.S. Cl. ...................................... 521/146; 521/56; 521/79; 521/94; 521/137; 521/139; 521/147; 521/170
[58] Field of Search ..................... 521/56, 79, 94, 137, 521/139, 147, 170, 146

[56] References Cited

U.S. PATENT DOCUMENTS

| | | | |
|---|---|---|---|
| 3,284,415 | 11/1966 | Horvath | 525/131 |
| 3,313,789 | 4/1967 | Naarmann et al. | 526/309 |
| 4,215,023 | 7/1980 | Strolle | 524/197 |
| 4,234,468 | 11/1980 | Dalibor | 524/853 |
| 4,262,099 | 4/1981 | Heaps et al. | 525/374 |

*Primary Examiner*—Morton Foelak
*Attorney, Agent, or Firm*—R. B. Ingraham

[57] ABSTRACT

Excellently properties, thermoplastic compositions well adapted for conversion by conventional melt-processing extrusion and other ordinary fabrication techniques into very good quality, lightly cross-linked, thermocollapse-resistant, closed-cell plastic foam(s) and the like expanded cellular product(s) are comprised of an intimate mixture of:

(A) a sparsely hydroxylated, normally-solid olefin polymer, particularly a linear alkenyl aromatic or polyolefin polymer which is frequently at least substantially a styrene polymer which is generally in copolymeric form with appropriate moieties of comonomers adapted to provide the requisite attached hydroxyl units therein and thereon; and (B) a minor proportion of an inter-reactive, cross-linking polyisocyanate constituent.

2 Claims, 22 Drawing Figures

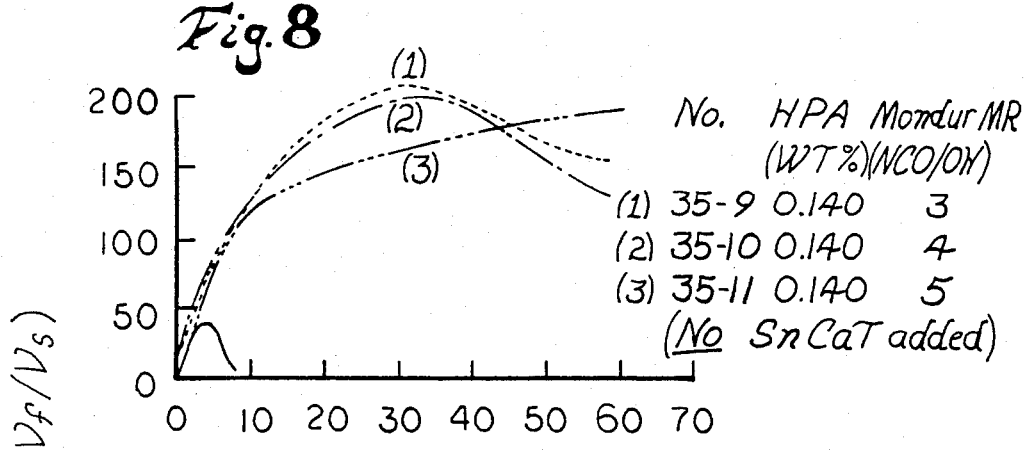
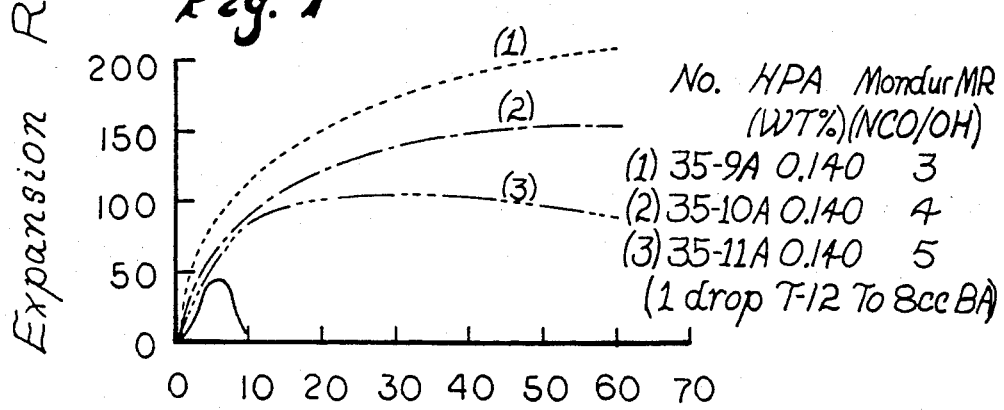
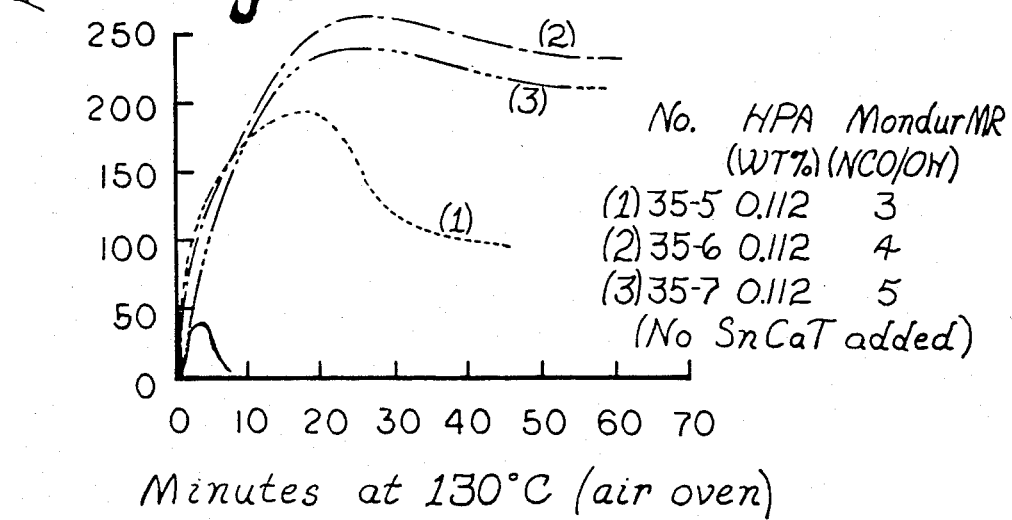

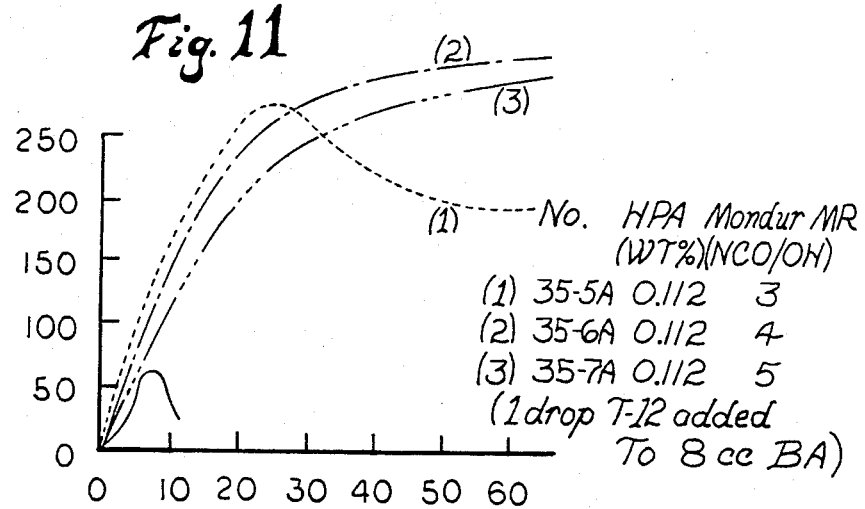
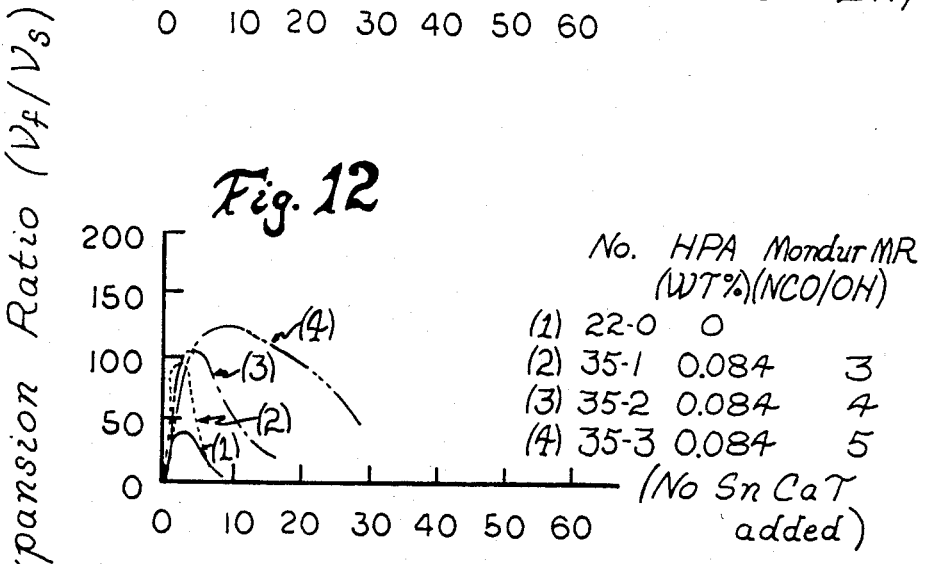
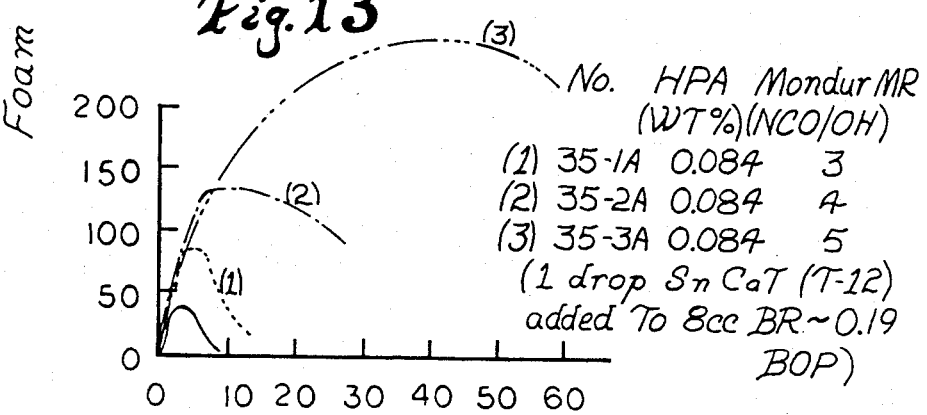
Minutes at 130°C (air oven)

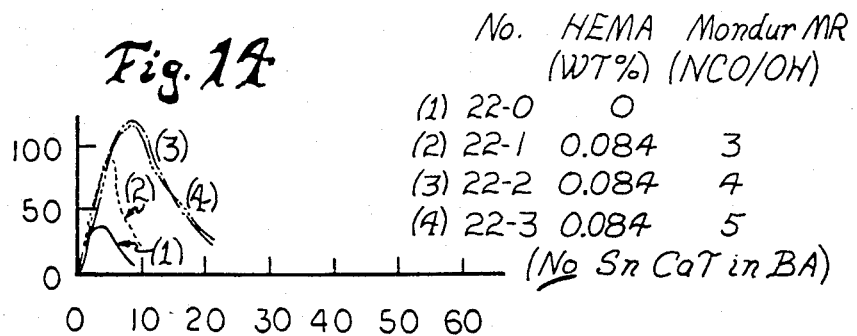
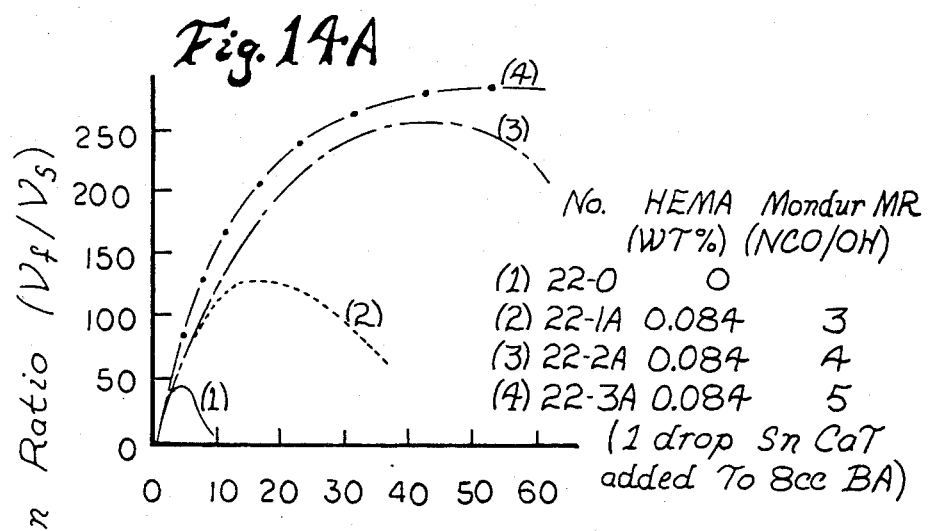
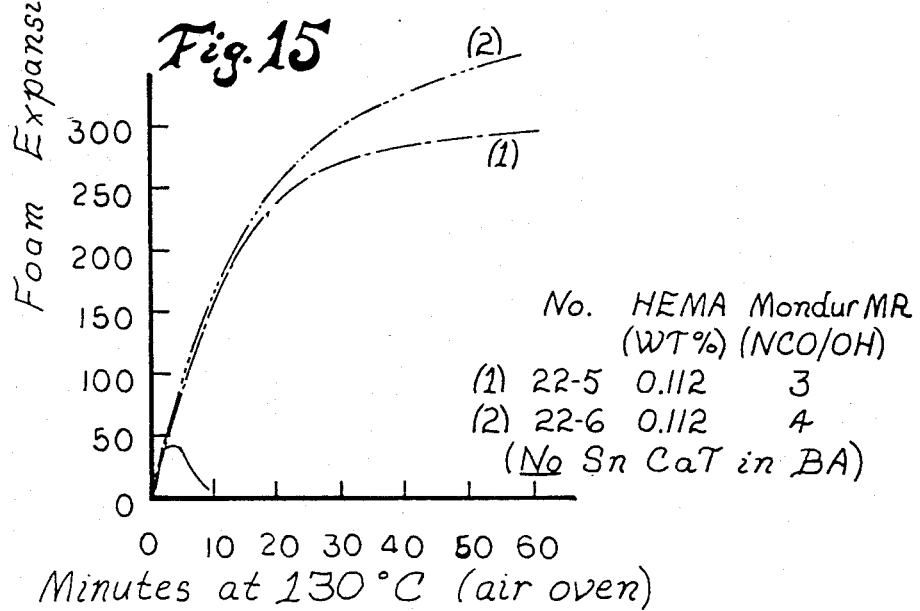

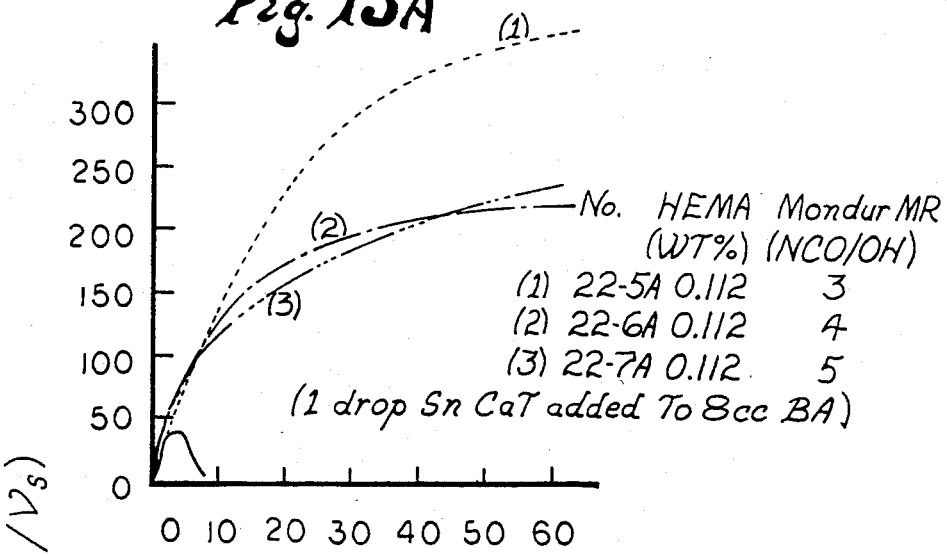
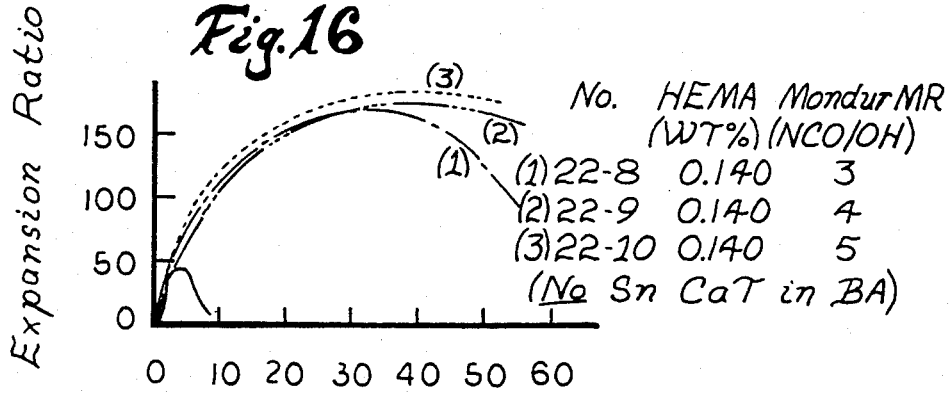
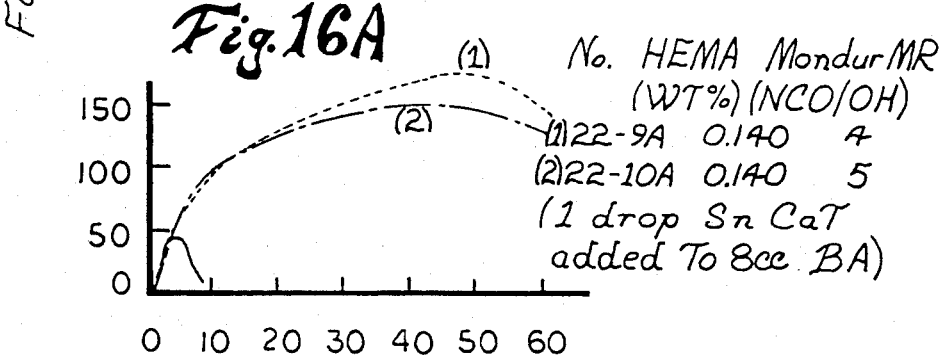

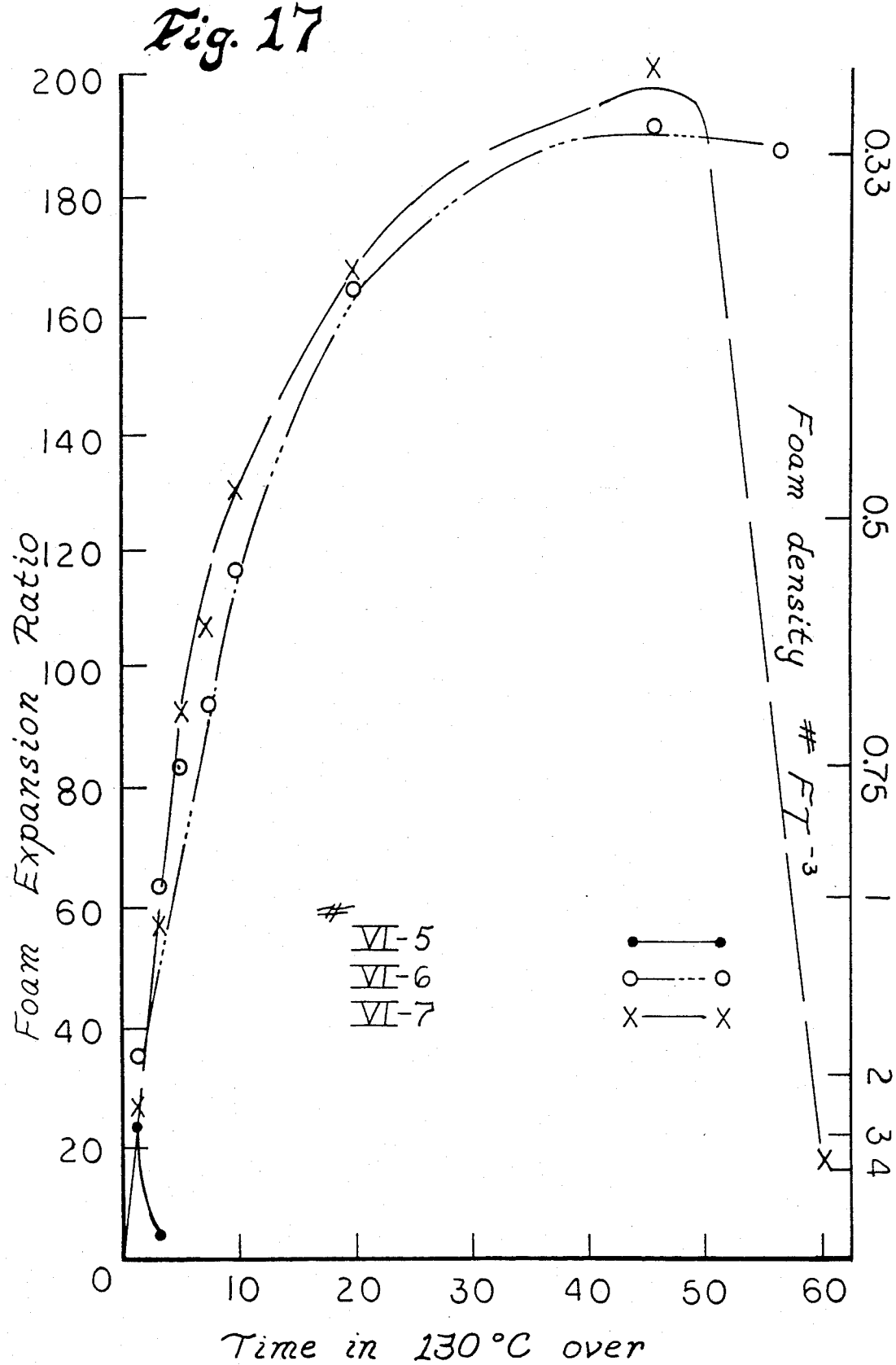

STRESS-STRAIN PROPERTIES OF CERTAIN OLEFIN POLYMER PRODUCTS

BETTER FOAMABLE STYRENE AND OTHER OLEFIN POLYMER COMPOSITIONS

CROSS-REFERENCE TO RELATED APPLICATION

This is a divisional of application Ser. No. 545,316, filed Oct. 24, 1983 which is a divisional of application Ser. No. 256,758, filed Apr. 23, 1981 now U.S. Pat. No. 4,448,933.

BACKGROUND OF THE INVENTION

Closed-cell foam and the like expanded cellular products of conventional non-crosslinked thermoplastic polymers usually tend to very rapidly collapse when exposed to heat at a temperature level that is more than about 20° C. or so above either the glass transition temperature ($T_g$) or the crystalline melting point ($T_m$) of the involved polymer.

It is known that lightly cross-linked thermoplastic polymers will expand to good quality, low density foams capable of resisting collapse at temperatures that are as great as 50°–100° C. and more higher than the collapse temperature of the corresponding, non-cross-linked polymer in the involved system. Generally, such lightly cross-linked polymer systems are provided so as to have between about 1 and about 3 actual cross-links per weight average molecule of the therein involved polymer. Copolymers of styrene with minor amounts of divinylbenzene (such as those containing on the order of about 0.04 percent by total molecule weight of interpolymerized divinylbenzene and which may conveniently be designated by the description "styrene-co-0.04%-divinylbenzene") are typical of such lightly cross-linked polymer systems. Also representative of same are analogous products of various ethylene, propylene, etc., polymers and copolymers cross-linked chemically and/or by ionizing radiation influences and the like.

Ordinarily, however, such lightly cross-linked polymer systems are incapable of fabrication into foam products by melt processing techniques if any satisfactory degree of thermocollapse resistance is desired in the expanded goods finally obtained; the reason for this being that mechanical shear almost unavoidably tends to at least materially disrupt if not destroy the involved cross-linked network structure thereby serving to both seriously degrade not only foaming behavior but to substantially, if not entirely, impair desired enhancement of thermocollapse resistance capability.

The relevant state of the art in the area of present interest is well represented and brought forth by U.S. Pat. Nos. 2,848,427; 2,848,428; 2,948,664; 2,948,665; 2,952,594; 3,098,831; 3,098,832; 3,264,272; 3,526,652, 3,717,559; 3,878,133; 3,940,517; 3,960,784; 3,986,991; 4,169,921 and 4,234,531 (the respective subject matters and disclosures of each and every one of which are herein contemplated and incorporated by reference).

Nonetheless, nothing known prior hereto appears to realistically concern itself with suitable polymeric compositions that are well adapted for conversion by normal melt processing procedures into fine quality, closed-cell, thermocollapse resistant foams in the way so indigenously advantageous as in the present contribution to the art.

FIELD OF THE INVENTION

The present invention concerns the provision, as well as the means or method, for preparation and fabrication thereof, of commonly available and widely-employed essentially non-crosslinked polymers that are beneficially functionalized by hydroxylation as and for feedstock or input material supply to conventional melt-processing apparatus and especially for very good foam production wherein certain polyisocyanate additaments in the molten feedstock participate in a reaction with the functionalized non-crosslinked polymer so as to therewith form inter-polymer-chain covalent bonds and thereby produce in the involved system relatively highly-branched or network structures.

The resultant network, crucial for realization of foam products having superior features of thermocollapse resistance, is produced and made available at a stage in the melt-processing procedure when subsequent mechanical shear degradation is minimal, i.e., just prior to or at some sooner or later point after emergence of the thermoplastic system from a suitable die or other shaping means associated with an extruder or other suitable melt-processing apparatus.

Moreover, in certain embodiments said network structure can be provided in such a fashion that substantial part-crosslinking mechanical shear can also be tolerated.

The facilitation and achievement of all of the foregoing are amongst the principle aims and objectives of the invention; with even more and additionally other benefits and advantages derivable in and from present practice, appearing and becoming more evident in the ensuing description and specification.

SUMMARY OF THE INVENTION

The present invention, and the discovery on which it is based, broadly pertains to highly improved, advantageous, novel and better-than-anticipated alkenyl aromatic and/or other ethylenically unsaturated monomer olefin polymer compositions, particularly those that are substantially, if not truly essentially of polymerized styrene, which are very well adapted to production of quite durable foam products having outstanding characteristics of thermocollapse resistance, all pursuant to and as is in generic basic outline set forth and defined as a composition comprising, in intimate admixture:

(a) as a fundamental constituent, a sparsely hydroxylated, normally-solid, linear olefin copolymer; and
(b) a substantially minor proportion of an inter-reactive cross-linking polyisocyanate constituent; and the method of making a lightly cross-linked, polymeric network product capable of being fabricated and formed as a thermoplastic, which method comprises the steps of:

(a) melting at a temperature beneath its thermal decomposition point, a sparsely hydroxylated, normally solid, olefin copolymer having a hydroxyl functionality of from at least 2 to about 5 average —OH groups per unit weight average molecule therein;

(b) adding to said molten hydroxylated copolymer a quantity of a reactive polyisocyanate in an amount sufficient to provide a ratio of between about 1.5 and about 6 —NCO units per each functional —OH group in said hydroxylated copolymer;

(c) mixing in the melt said hydroxylated copolymer with said polyisocyanate until the β-value of said thereupon reacted lightly cross-linked polymeric network product is between about 0.8 and about 3; then (d) thermoplastically forming said reacted product of step (c) into a solid shaped article form.

For immediate descriptive and explanatory purposes, the terms (whether employed in the singular of plural): "polymerization"; "non-crosslinked polymer"; "thermoplastic"; "foam" and "foamable"; "closed-cell"; "cross-linked", etc., "thermocollapse resistance"; "branched" and/or "network" structures; and so forth amongst the other terminology herein employed are of such basic fundamentality and so well within the knowledge and comprehension of those skilled in the art that further explanation thereof or elucidation thereon is unnecessary and, accordingly, not here set forth.

Illustrated Exemplification of the Invention

The invention is additionally demonstrated as to explanations and data pertinent thereto in and by the graphical portrayals and reproductions of the twenty-one (21) Figures, namely Figures Nos. 1-16, inclusive, 14A, 15A, 16A, 17, 18 and 19, in the accompanying Drawing, as they are individually mentioned, explained and to be taken in conjunction with the specification that follows.

In the respective illustrations of the Drawing (as well as in other possible occurrences throughout the specification), the following symbols and abbreviations have the following meanings and definitions, namely:

$W_f$ means weight fraction;
$M_n$ stands for number average molecular weight;
$M_w$ stands for weight average molecular weight;
$M_c$ stands for a calculated average molecular weight between cross-links in a polymer network;
HEA is hydroxyethyl acrylate;
$V_f$ is the expanded volume of a foam;
$V_s$ is the original solid volume of a polymer prior to foaming;
HPA is hydroxypropyl acrylate;
T-12 is dibutyltindilaurate;
BOP stands for "based on polymer weight";
BA stands for blowing agent; and
HEMA is hydroxyethyl methacrylate.

DESCRIPTION OF THE INVENTION

The present invention, in basic essence and substance, involves excellently-foamable, normally-solid, high molecular weight alkenyl aromatic and/or other olefinic polymers which are sparsely hydroxylated so as to be enabled to be lightly cross-linked and converted to a network structure system by reaction with minor proportions of admixed polyisocyanate in conjunction with which a suitable blowing agent can be simultaneously or subsequently impregnated in the system for production of foam products.

It is advantageous for the non-crosslinked polymer chain in the hydroxylated olefin polymer to be an alkenyl aromatic polymer such as, for example, a styrenic polymer. Nonetheless, besides the ordinarily-preferable styrenic polymers and in place of or as non-crosslinked polymers that are copolymers therewith, various polymers and copolymers of other alkenyl aromatic monomers may be utilized. These are polymerizates of monomers of the Formula (which includes styrene):

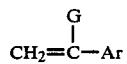

(I)

wherein G is selected from the group consisting of hydrogen and methyl and Ar is an aromatic radical (including various alkyl and halo-ring-substituted aromatic units) of from 6 to about 10 carbon atoms. These, frequently quite satisfactorily, include polymers and copolymers of: α-methylstyrenes; vinyl toluene; vinyl naphthalene; the dimethyl styrene; t-butyl styrene; the several chlorostyrenes (such as the mono- and dichloro-variants); the several bromostyrenes (such as the mono- and dibromo-variants); and the like.

It is also possible, oftentimes with particular specific desired benefit(s) attached, for the non-crosslinked polymer chain to be a hydroxylated binary or ternary copolymer or an even more complex interpolymerized structure formed with an alkenyl aromatic monomer, particularly styrene copolymerized with an other than Formula (I) monomer which is copolymerizable therewith and which is generally unreactive with an isocyanate moiety. Such non-crosslinked copolymers may include those prepared from addition polymerization reaction of the Formula (I) monomer(s) with such other monomers as: esters and nitriles of unsaturated carboxylic acids such as, for example, methyl acrylate, ethyl acrylate, methyl methacrylate, acrylonitrile, α-methacrylonitrile, etc., methyl vinyl ketone and methyl isopropenyl ketone; and the like.

Even more generally, the non-crosslinked polymer chain in the hydroxylated polymer can, as indicated, be a polymer or copolymer of various olefin monomers and derivatives thereof, as ethylene, propylene, butylene and others (including likes and equivalents) containing up to 8 or so carbon atoms in the basic hydrocarbon or substituted hydrocarbon monomer unit involved.

To illustrate some advantages of using other comonomers with Formula I monomers to provide the non-crosslinked polymer chain for hydroxylation: methyl methacrylate usually enhances the weatherability of foam products made in accordance with the present invention; while inclusion of methacrylonitrile tends to decrease the permeation capability through cell wall formations of volatile organic blowing agents often desirable to employ in the production of foam products. Thus, the hydroxylated alkenyl aromatic polymer constituent may, with frequent advantage, be such a terpolymer as styrene-co-acrylonitrile-co-hydroxyethyl acrylate or styrene-co-methyl methacrylate-co-hydroxyethyl methacrylate, and the like.

In any event, it is advantageous for the non-crosslinked polymer chain, disregarding other constituents therein introduced for hydroxylation achievement thereof, to have at least about 60 percent by weight based on total polymer weight (i.e., "wt %") of the hereinbefore defined olefin monomer(s), especially Formula (I) monomers such as styrene and the like polymerized therein.

There are several convenient and quite satisfactory ways to provide the sparsely hydroxylated linear alkenyl aromatic and analogous olefin polymer constituent involved in present practice.

A preferred technique is to form a solid copolymer (including ternary and higher polymerizates) from the above-described olefin monomers such as, for example, the Formula (I) monomers (e.g., styrene, etc.) or any mixture thereof with a minor proportion of a hydroxyalkyl acrylate, hydroxyalkyl methacrylate or higher homologue to provide a structure of the typifying general Formula (when styrene is the involved alkenyl aromatic monomer):

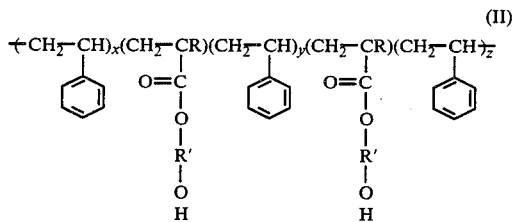
(II)

wherein each R is independently selected from the group consisting of hydrogen and methyl; each R' is independently an alkylene unit containing from 2 to about 20 carbon atoms, beneficially from 2 to 4 carbon atoms; and x, y and z are independently integers of magnitudes adequately high to result in normally-solid copolymeric products. Obviously, when olefin monomers other than styrene are utilized, the specific structure of the hydroxylated Formula II polymers will vary accordingly, as will also be the case when the non-crosslinked polymer chain is comprised of copolymers of styrene or other Formula I monomer(s) with other addition polymerizable monomers (besides the hydroxyalkyl acrylates) that are copolymerizable therewith.

The hydroxylated polymers of Formula II are aptly described as "polystyrenic polyols", and are generally equivalent to hydroxylated linear alkenyl aromatic polymers. Typical examples of the hydroxy-unit-containing monomers to employ for preparation of Formula II polymers include: hydroxyethyl acrylate; hydroxypropyl acrylate; hydroxyethyl methacrylate; hydroxypropyl methacrylate; and the like. The quantity of same to utilize depends on the number of —OH attachments desired per weight average hydroxylated alkenyl aromatic polymer molecule chain, as hereinafter more concisely specified.

In any event, such typical Formula II polymers as: styrene-co-hydroxyethyl acrylate; styrene-co-hydroxypropyl acrylate; and styrene-co-hydroxyethyl methacrylate are very useful in practice of the present invention.

The Formula II randomly hydroxylated polymers have a structure which may be fancifully depicted by the representation in FIG. 1 of the Drawing, wherein the reference letter "C" designates the essential alkenyl aromatic polymer chain.

Figure 2:
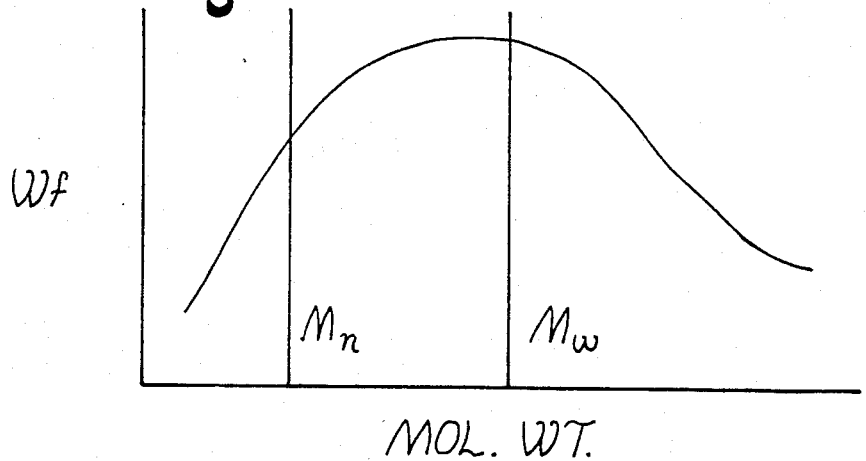

FIG. 2 of the Drawing figuratively portrays the polydisperse molecular weight distribution characteristics of Formula II polymers, wherein the ratio of $M_w:M_n$ is ordinarily on the order of 2:1 to 3:1.

Figure 3:
Figure 4:
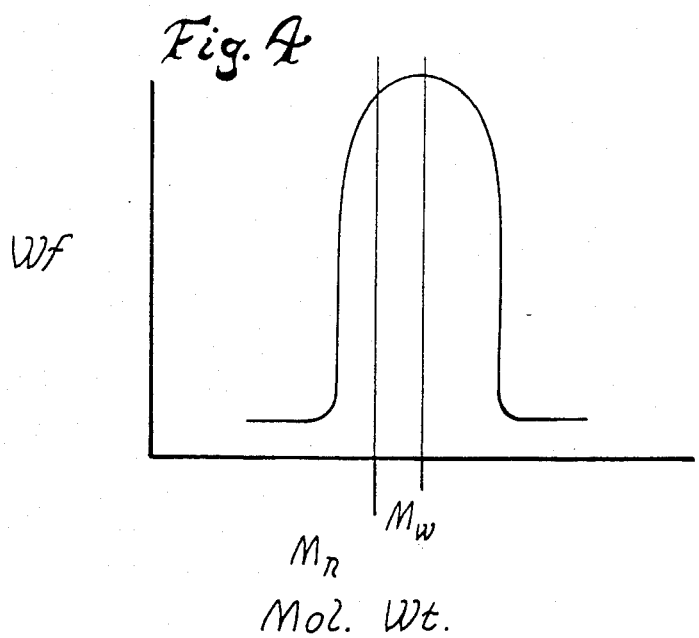

Another suitable way to provide the hydroxylated alkenyl aromatic polymer constituents is to make the non-crosslinked polymer with an anionic $RLi_2$-type (or the like or equivalent) catalyst or initiator to provide, upon terminating reaction with ethylene or other alkylene oxide functional end-capping units a hydroxylated constituent product having —OH appendages at each end of the alkenyl aromatic polymer chain so that there are two hydroxyl moieties in each such chain. FIG. 3 of the Drawing depicts the morphology of such hydroxylated constituents which (quite advantageously for many purposes) have a relatively monodisperse molecular weight distribution. The latter characteristic of such hydroxylated constituents is shown in FIG. 4 of the Drawing, wherein it can be seen that the ratio $M_w:M_n$ is on the very low order of about 1:1 to 1.2:1.

Analogous suitable hydroxylated ethylene and other olefin polymer constituents can be prepared by the well-known and now conventional high pressure tubular process that is oftentimes utilized for the manufacture of polyethylene and various ethylene copolymers.

The average hydroxyl functionality of the hydroxylated polymer constituent is preferably between about at least 2 and about 6 —OH groups per weight average molecule therein. For optimized results, this functionality is on the order of 3±0.5; superior foaming behavior being thereby realized.

Any of a good number of commercially or otherwise readily available and well known to those skilled in the art polyisocyanate materials can be utilized to get excellent results in and for the cross-linking and network structure formation of the hydroxylated alkenyl aromatic or other olefin polymer constituent. These, typically, include such commercial materials as "MONDUR MR", "MONDUR MRS" and "MONDUR MR-200" (produced by The Mobay Chemical Company) and "PAPI 580", "PAPI 135" and "PAPI 27" (manufactured by The Upjohn Company). These, chemically, are polymethylene polyphenylene polyisocyanates, and, characteristically, they are compounds having two or more isocyanate groups per molecule thereof. Depending on the particular choice of polyisocyanate that is made, a catalyst to promote the cross-linking and network building reaction between the involved respective —NCO groups (in the polyisocyanate) and —OH groups (in the hydroxylated alkenyl aromatic copolymer constituent) may or may not be required, as is readily determinable by simple and straight forward testing routine. In this connection, typical quantities of catalyst to employ are from about 0.05 to 0.1 or so weight percent BOP. Further along this line, toluene diisocyanate, toluene diisocyanate trimer and the like, are other useful polyisocyanates to employ in practice of the present invention. Regardless of which particular polyisocyanate constituent is employed, it is at times advantageous to utilize in conjuncton therewith conventional catalytic agents which are known to promote the desired —NCO/—OH reaction such as, for example, dibutyl tin dilaurate, stannous octoate and the like or equivalent catalysts in effective catalyzing amounts.

In those preferred embodiments in which the average hydroxyl functionality is from at least 2 to about 6 —OH groups per weight average polymer molecule, the equivalents of —NCO units provided by the polyisocyanate to the —OH units present in the hydroxylated polymer constituent is preferably on the order of at least about 1.5 to about 6 —NCO's per —OH group in the polymer. More advantageously, the —NCO:—OH ratio to utilize in such instance is about 2:1 to 5:1 or so.

Optimum foaming behavior is realized when the product of the hydroxylated polymer constituent and the polyisocyanate reaction is sufficiently crosslinked to result in a visually detectible gel in a solvent which normally totally dissolves the corresponding non-crosslinked hydroxylated polymer. Markedly improved thermocollapse behavior chracteristics of foam products manufactured in accordance with practice of the present invention are provided when the so-called cross-linking coefficient (i.e., "δ"—which represents the number of cross-links per weight average molecule) ranges between values of about 0.8 to about 3, and especially at a cross-link coefficient on the order of about 1 or so.

As an illustration of this, a 371,000 $M_w$ copolymer of styrene having polymerized therein 0.1 weight percent hydroxyethyl acrylate will react with "MONDUR MR" (in effective —NCO/—OH ratio of 2) at 165° C. with 0.07 weight percent BOP dibutyl tin dilaurate catalyst added to produce about one interlink per weight average chatn. Such lighly cross-linked polymer product exhibits optimum foam expansion capability and extraordinary thermocollapse resistance. Of course, if $M_w$ of the involved hydroxylated copolymer is higher or lower, the associated —OH concentration must be accordingly adjusted in order to get best results, as is apparent to those skilled in the art.

It is important to note and observe that when the isocyanate material is employed with the hydroxylated alkenyl aromatic or other olefinic copolymer constituent, some amount of water (even in truly miniscule amounts) is needed to be present to avoid the possibility of resulting with an insufficiency or even an absence of cross-linking in the isocyanated product. This (and actually usually preferably so) is such a small quantity of moisture as is obtained from water in an atmosphere at normal room temperature having only a, say, 30% Relative Humidity value (in contrast, for example, to the essentially arid and moisture-free condition of the atmosphere in typical "dry box" surroundings). Often cross-linking can be induced by the application of heat with or without the presence of a crosslinking promoting catalyst.

Literally any volatile organic blowing agent may be used in conventional or otherwise desired amounts for mixture with the polymer, especially in melt form, to produce very good expandable compositions. These include, by way of illustration: monochloromethane ($CH_3Cl$); dichlorodifluoromethane ($CF_2Cl_2$), trichloro, monofluoromethane ($CFCl_3$); trichloro, trifluoroethane ($C_2F_3Cl_3$); propanes; butanes; pentanes; and mixtures thereof. The blowing agent is generally mixed with the polymer melt to produce expandable compositions. If the temperature of the blowing agent/polymer mixture is above its foaming temperature upon exit through a die or other shaping device into an atmospheric or subatmospheric environment, environment foaming will occur. If the blowing agent/polymer mixture is sufficiently cool (or cooled) prior to exiting from the die or the like, non-expanded forms, such as strands, sheets, films and the like are produced. Expansion tendencies are arrested by immediate cooling of extrudate, as in cold water. Such chilled solid compositions will foam to low density cellular structures by heating thereof above the glass transition temperature ($T_g$) of same.

As has been indicated, the excellently-foamable reaction products made pursuant to practice of the present invention are readily produced by using ordinary and typical hot melt processing procedures in conventional and commonly-employed mixing equipment in order to produce foams and the like cellular expanded goods and products that exhibit greatly improved thermostability; a characteristic that is readily differentiatable over and distinguishable from prior art techniques wherein crosslinking reactions are carried out during actual polymer production (as is the case involving the well-known styrene/divinyl benzene copolymers).

For the preparation of shaped and fabricated articles and other useful products from the various involved compositions in practice that is in keeping with the present invention, there are at least two related, albeit somewhat distinct, procedures to apply.

These are:
(i) Addition of the cross-linking agent to the composition (along with any necessary catalysts for the purpose) just prior to emergence from a shaping or forming means—such as a die—so that the advantages of thermoplasticity are available for the crucial forming purpose; and/or
(ii) Actual forming of the composition in thermoplastic condition followed by the added and significantly augmentative cross-linking influence of moisture from the atmosphere, steam or other water providing agent in order to secure a maximum cross-linking effect in the thus-shaped article after initial fabrication thereof.

The foamable compositions of the present invention can, if desired or required, be aptly provided with and contain other additaments that are oftentimes included in such compositions such as, by way of illustration: antioxidants; pigments; dyes; fillers (either pulverulent, particulate or fibrous of an organic and/or inorganic or metallic nature); stabilizers; mineral oil(s) and other purposeful plasticizers; and the like. Such additives should be generally nonreactive with the crosslinking components such as the hydroxylated polymer and polyisocyanate.

The commendable and desirable products and goods providable in practice of the present invention include: expandable thermoplastic particles, beads, strands and other fiber-like tapes and pulverulant forms, sheet and film embodiments, etc., all of which are capable of being foamed to excellent closed-cell, thermocollapse-resistant structures; and extruded closed-cell foams and the like expanded cellular goods in any desired shape, form or architectural embodiment that resist collapse at temperatures which are significantly higher (e.g., on an order of from 10° to 50° C.) than the relative collapse temperature of foams from the unmodified parent thermoplastic polymer involved.

EXAMPLES OF THE INVENTION

The following illustrative examples show the great benefit(s) obtainable in practice of the present invention.

First Illustration

A copolymer of 99.9 weight percent of styrene and 0.1 weight percent of hydroxyethyl acrylate was prepared. A catalytic amount (0.2 weight percent) of benzoyl peroxide was employed for initiation of the polymerization. The copolymer product was made in sealed bottles to form cylindrical billets, each of which had a diameter of about 2½ inches and a length of about 3 inches. Polymerization was accomplished by rotating the bottles in an 80° C. water bath for six days, followed by exposure for an additional day to heat in an oven at 125° C.

The copolymer product was toluene soluble. Its molecular weight characteristics, as determined by gel permeation chromatography, were as follows:
$M_n = 138,000$;
$M_w = 324,480$; and
$M_w/M_n = 2.35$.

A portion of the copolymer product (Sample 1) was set aside for testing.

An additional 50 gm quantity of the copolymer product was placed (in ground, particulate form) in the mixing chamber of a Brabender "Plasti-Corder" milling unit preheated to 180° C. After 8 minutes of milling at 60 rpm, the melt consistency of the copolymer was 1,280 metergrams of torque, as indicated by the milling machine. Gel permeation chromatography testing of the milled product provided the following molecular weight data thereon:

$M_n = 119,000$; and
$M_w = 270,000$

A portion of the milled copolymer (Sample 2) was also taken for testing. The molecular weight reduction of this particular material was presumed to have been due to the intense mechanical shearing done to the melt.

To the remainder of the molten copolymer in the "Plasti-Corder" unit, a sufficient quantity of "MONDUR MR" polymeric polymethylene polyphenyl isocyanate was added to provide 3 equivalents of —NCO units for each equivalent of —OH in the 99.9 weight percent styrene (co) 0.10 weight percent hydroxyethyl acrylate in the melt.

In this connection, the "MONDUR MR" employed was a very viscous, crude brown colored material having a composition following the supposed general structure (for the various "MONDUR" polymethylene polyphenyl isocyanates, with "MONDUR MRS" falling within such overall structural parameter):

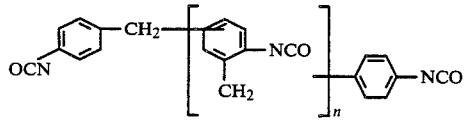

wherein, at about a 30–32 weight percent content of —NCO, n has a value of 0; while at about a 20 or so weight percent —NCO quantity, n is 1; and at 10–12 weight percent —NCO, n is 2; and n has a value of from 3–8 when the —NCO content is in the neighborhood of 25 weight percent. The "MONDUR MR" employed reportedly (from a usually highly-reliable source) had: a 31.5 weight percent —NCO content; an amine equivalent value of 133; an average functionality of 2.6; an acidity value, measured as % HCl, of 0.04; and a viscosity (mPa-s) at 25° C. of 200+ cps; the same containing 0.04 percent hydrolyzable chlorides and 0.3 percent total chlorides and also having a density of 1.24 g/cm³ with a 210° C. flash point (COC) and a −18° C. pour point.

Immediately following the "MONDUR MR" addition, milling of the melt was continued for 3 minutes and the temperature rose to 190° C. A portion of the isocyanate-treated copolymer (Sample 3) was reserved for testing. Its molecular weight data, determined by gel permeation chromatography, were:

$M_n = 119,000$; and
$M_w = 350,000$.

Each of the samples 1, 2 and 3 were then ground into fine particles having an average diameter of 1.5–3.0 millimeters. The respective particulate samples were subsequently impregnated with a 75:25 weight ratio mixture of dichlorodifluoromethane ($CF_2Cl_2$) and trichloromonofluoromethane ($CFCl_3$) by heating them in the presence of the blowing agent in sealed glass ampoules rotated at 80° C. for 18 hours. There was also present in the finally impregnated samples (and as a normal result of their handling) a trace of water; this having been on the order of 10–20 ppm which had occurred from atmospheric condensation. The final blowing agent concentration in the samples was about 23–25 weight percent.

Aliquots of the impregnated pellets of Samples 1, 2 and 3 were then heated in an air oven to 130° C. for varying periods of time to produce foam products. The expansion ratios of these foam products (i.e., the ratio of foam volume or "$V_f$" to original solid volume or "$V_s$") were then measured by water displacement techniques, this having been done to obtain $V_f$ figures at least 24 hours after removal from the oven of the foamed products.

The results are set forth in the following Table I.

TABLE I

| Sample No. | Expansion Ratios ($V_f/V_s$) of Foamed Samples After Oven Heating at 130° C. Heating Time in Minutes | | | | | |
|---|---|---|---|---|---|---|
| | 1 | 3 | 5 | 10 | 20 | 30 |
| 1 | 60 | 20 | 10 | 5 | — | — |
| 2 | 46 | 10 | 5 | — | — | — |
| 3 | 50 | 96 | 110 | 125 | 140 | 145 |

All of the freshly foamed products had uniform fine cell structures which were of an average size of about 0.2 to 0.5 mm. However, the foams from Sample 3 exhibited greatly improved expansion characteristics and were capable of effectively resisting thermocollapse for more than 30 minutes at 130° C.

Correlated to the above-described experimentations, considerable associated testings have demonstrated, per indications in the preceding Specification, that the —NCO/—OH ratio has great influence on the δ crosslinking coefficient which, as explained, is a measure of the formation of highly long chain, branched or network polymers effected. To further and more specifically illustrate this, a hydroxylated copolymer as identified above in the instant Illustration which has a 371,000 $M_w$ will react with "MONDUR MR" in an —NCO/—OH ratio of 2 at 165° C. (with associated use of 0.07 weight percent of dibutyl tin dilaurate in the reaction mass) so as to provide and yield about one interlink per weight average chain. The effect of the trace moisture contained in and obtained from the blowing agent must also be given due regard as to the beneficial influence thereby exerted in achievement of the good results obtained in the testings. In this, the presence of traces of water is not so crucial when a catalyst, such as the mentioned tin compound, is employed. In any event, polymers made as demonstrated have exhibited optimum foam expansion capability and superior thermocollapse resistance. As will be readily evident to those skilled in the art, if and when copolymer $M_w$ is higher or lower, appropriate corresponding adjustment in —OH unit attachment(s) on the hydroxylated polymer molecule must be made.

Second Illustration

Following the procedure for polymerization described in the First Illustration, a number of hydroxylated copolymer samples were prepared in sealed glass ampoules to make the several compositions identified in subsequent Table II (also including, as Sample 4, a non-hydroxylated polystyrene).

A "MONDUR MR" material (the same as in the First Illustration and employed at a 2:1 ratio of —NCO:—OH) was added to each polymer tested excepting Sample 4. The "MONDUR MR" additions were done in a 20 weight percent methylene chloride ($CH_2Cl_2$ or $MeCl_2$) solution. After addition to each sample of 0.07 weight percent, based on polymer weight, of dibutyl tin dilaurate ("T-12") catalyst, sample films were cast onto "TEDLAR" ™ film substrates and the $MeCl_2$ evaporated under vacuum for 20 hours at room temperature.

Multiple layers of the dried sample films were compression molded for 5 minutes at 165° C. into bars having a thickness of 0.062 inch. Squares of 0.25 inch on a side of each of the sample moldings were immersed in toluene for solubility determination, while a second set of each was pressurized at 80° C. with 75/25 $CF_2Cl_2/CFCl_3$ blowing agent mixture containing trace amounts of water for foaming experiments. While such conditions of blowing agent impregnation tend to introduce about 30 weight percent of blowing agent in the therewith-loaded polymer, the impregnated products nonetheless permit good observations to be made of foaming behavior of the various samples insofar concerns the sensitivity of same to polymer structure.

The compositions are given in Table II, along with solubility data thereon. Table II also lists the calculated values for the average molecular weight between cross-links (i.e., "$M_c$") and the cross-linking coefficient (i.e., "$\delta$"). $M_c$ was calculated per the Flory-Rehner Equation (see *J. Chem. Phys.* 11, 521, 1943) using the ratio values of weight of swollen gel ($W_g$) to initial polymer weight ($W_f$) with $W_g$ obtained after 24 hours immersion in toluene.

solves; but a very highly swollen, formless, slimy gel is also evident. In Table II, the $\delta$ value of one for these polymers is assigned, even though the $M_w/M_c < 1$. Theory predicts the gel point of a cross-linked network when the $\delta$ value is one, i.e., one tie point per weight average molecule.

Third Illustration

To more pointedly demonstrate and confirm that foam expansion capability of compositions in accordance with the present invention are both quantitatively related and sensitively responsive to cross-link density in the isocyanate-reacted, hydroxylated copolymers, an additional series of styrene-co-hydroxyethyl acrylate samples were prepared in general accordance with the 99.9 weight percent styrene/0.10 weight percent hydroxyethyl acrylate constitution and other procedures of the Second Illustration. The $M_w$ of all hydroxylated copolymer samples was 371,000. These hydroxylated copolymers were reacted in the melt with various —NCO equivalent(s)-providing quantities of "MONDUR MR".

Figure 7:
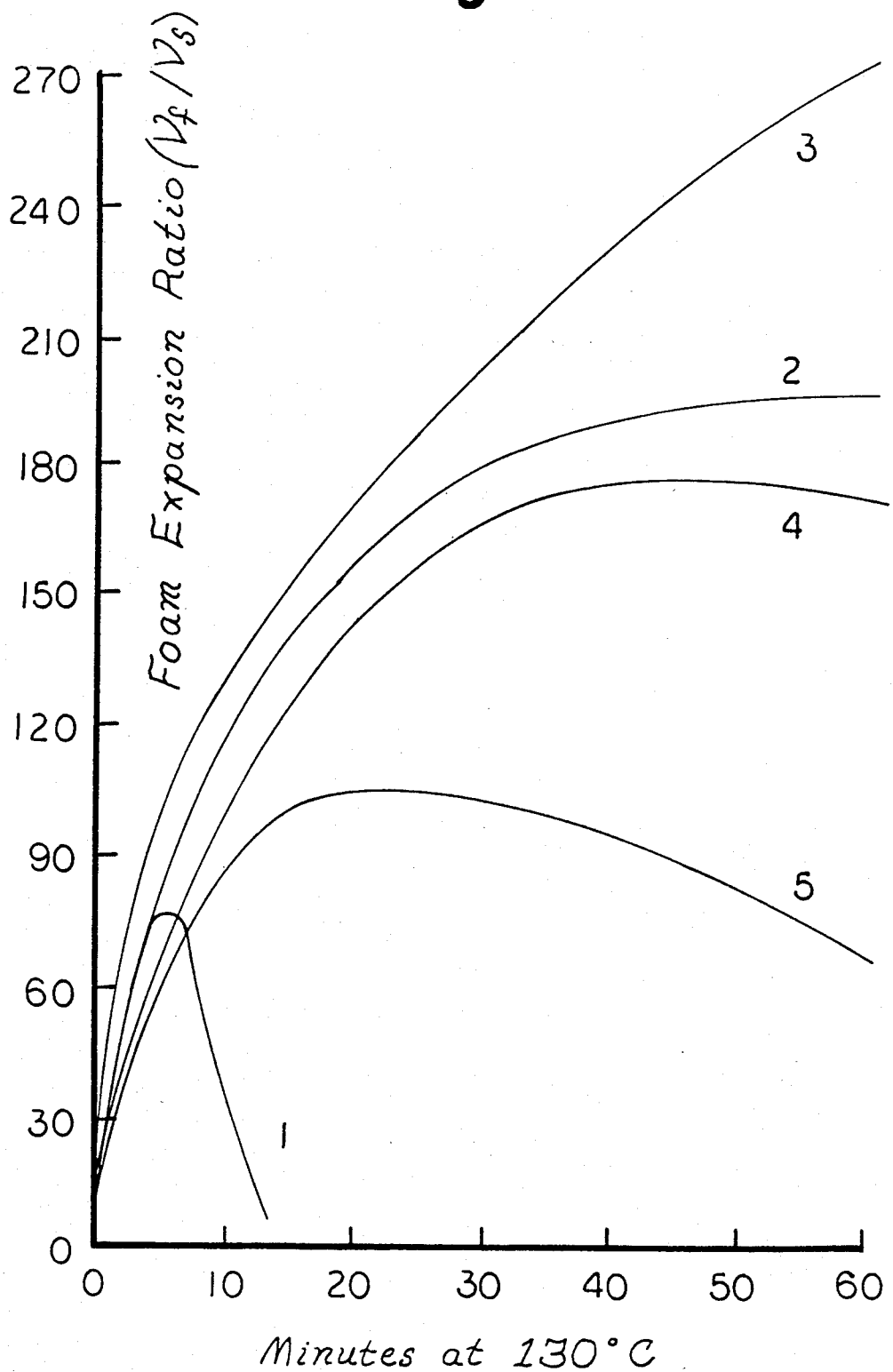

Toluene solubilities of samples cut from sheets molded at 165° C. for 5 minutes, along with other pertinent data, are set forth in the following Table III. Foaming data for the samples impregnated with 75/25 $CF_2Cl_2/CFCl_3$ blowing agent are shown in FIG. 7 of the accompanying Drawing wherein abbreviated sample numbers are associated with the appropriate curves.

TABLE II

Cross-Linking of Hydroxyethyl Acrylate (HEA) Compositions During Compression Molding at 165° C.

| Sample No. | Styrene (Wt. %) | HEA (Wt. %) | "MONDUR MR" (—NCO equivs Per —OH) | Toluene Solubility Prior To Exposure To Water | $W_g/W_s$ | $M_c$ ($\times 10^{-4}$) | $\delta$ |
|---|---|---|---|---|---|---|---|
| 4 | 100 | 0 | 0 | Soluble | | | |
| 5 | 99.95 | 0.05 | 2 | Soluble | | | |
| 6 | 99.92 | 0.08 | 2 | Soluble | | | |
| 7 | 99.9 | 0.1 | 2 | Partly soluble partly gelled | | | ~1 |
| 8 | 99.88 | 0.12 | 2 | Gel | 19.4 | 24 | 1.52 |
| 9 | 99.86 | 0.14 | 2 | Gel | 16.2 | 17.3 | 2.10 |
| 10 | 99.84 | 0.16 | 2 | Gel | 14.0 | 13.2 | 2.76 |
| 11 | 99.82 | 0.18 | 2 | Gel | 13.5 | 12.3 | 2.97 |
| 12 | 99.8 | 0.20 | 2 | Gel | 11.8 | 9.4 | 3.88 |

Figure 5:
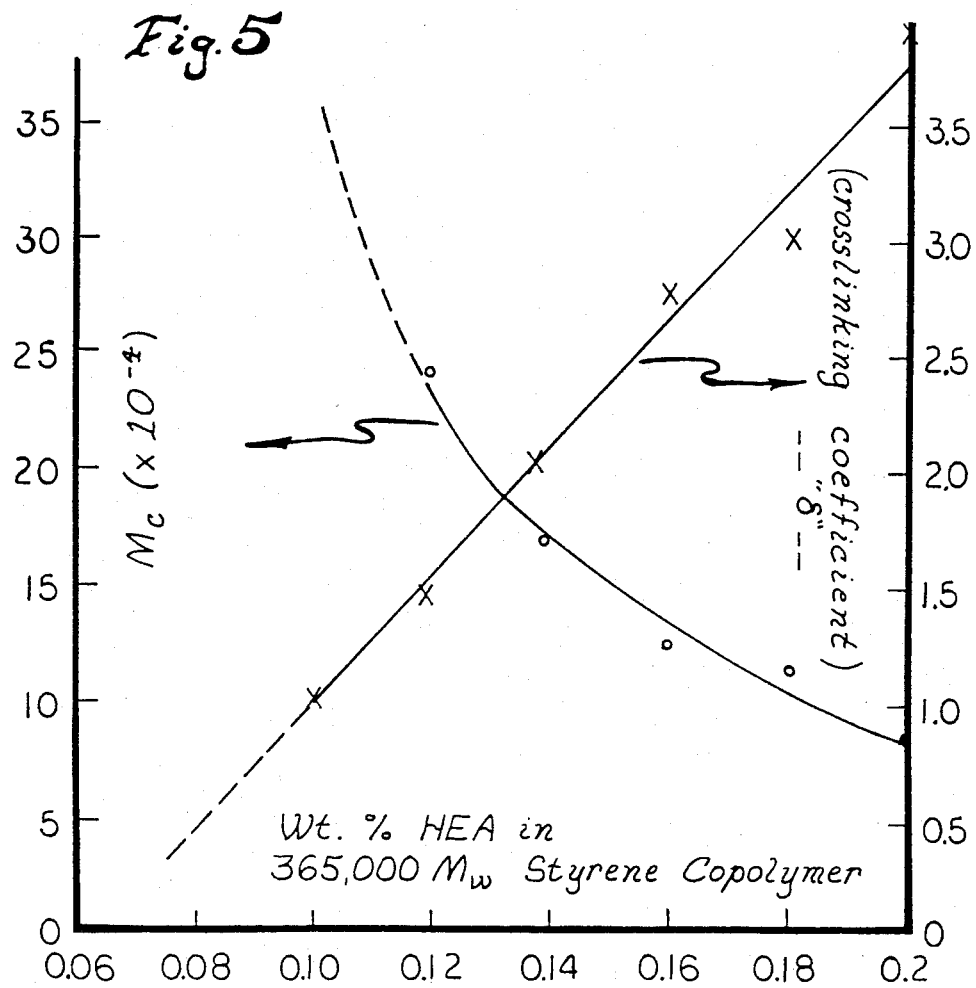
Figure 6:
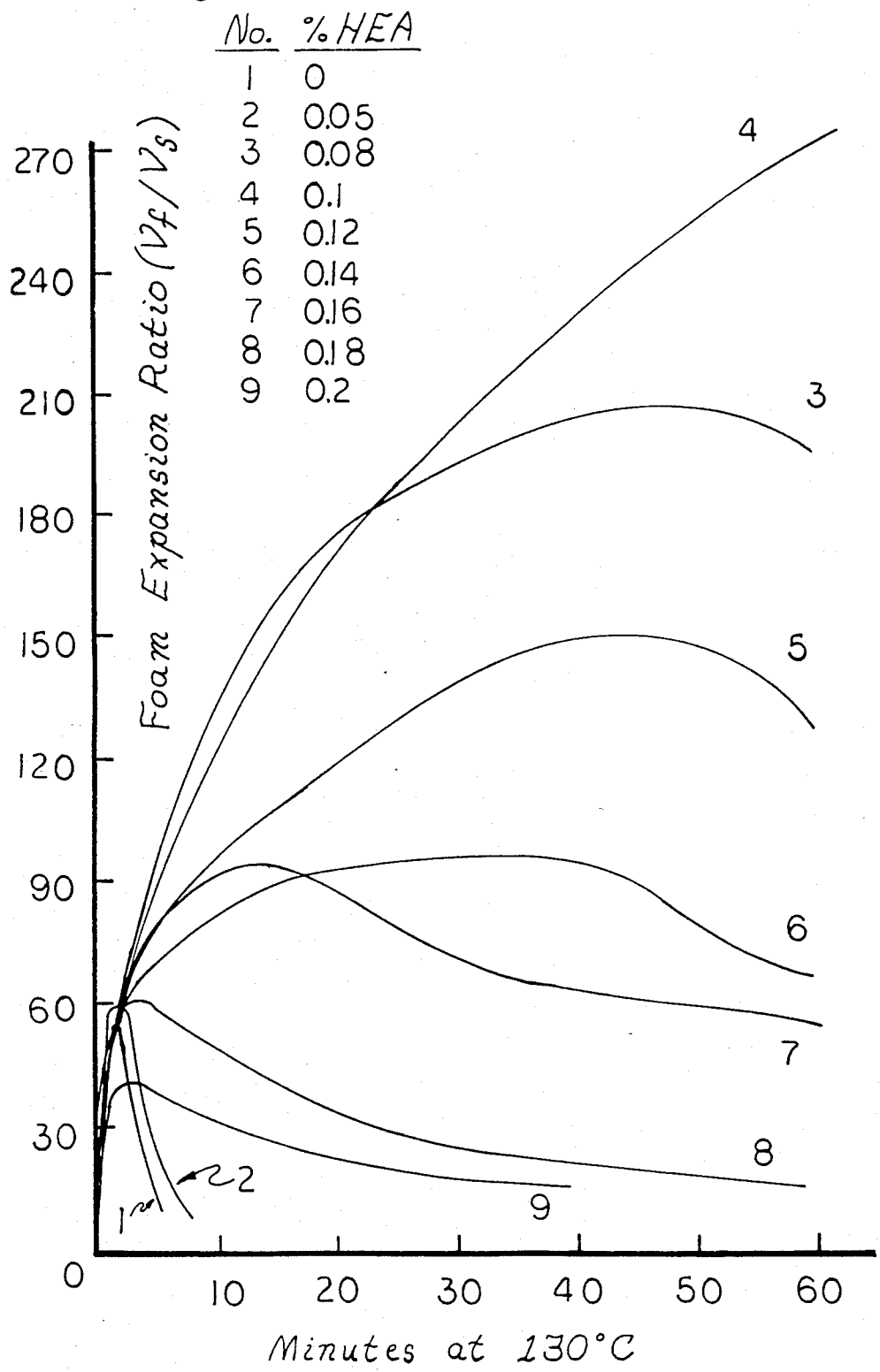

FIG. 5 of the accompanying Drawing plots $M_c$ and $\delta$ versus hydroxyethyl acrylate concentration after reaction with "MONDUR MR" at 2 —NCO/—OH in the presence of trace amounts of water in the manner described above. FIG. 6 plots $V_f/V_s$ for the blowing agent impregnated polymer squares in a 130° C. oven. The expansion ratios of the foams were again determined by water displacement 24 hours after cooling to room temperature. The reference numbers associated with the curves are the sample numbers.

These data indicate that styrene-co-hydroxyethyl acrylate reacts with "MONDUR MR" in the melt at 165° C. in the presence of dibutyl tin dilaurate. Modified structures with the optimum viscoelastic properties for foaming produce a fine cell, very low density expanded product (about 0.2–0.3 pounds per cubic foot), with such foams having good thermocollapse resistance at 130° C. Higher cross-link densities have been observed to restrict expansion somewhat.

FIG. 6 also indicates that maximum expansion ratios are achieved when the polymer shows the first evidence of insolubility in toluene. The polymer partially dis-

TABLE III

Reaction of "MONDUR MR" With 371,000 $M_w$ 99.90 Wt. % Styrene-Co-0.10 Wt. % Hydroxyethyl Acrylate

| Sample No. | "MONDUR MR" (—NCO/—OH) | Toluene Solubility | $W_g/W_s$ | $M_c$ ($\times 10^{-3}$) | $\delta$ |
|---|---|---|---|---|---|
| III-1 | 0.5 | Soluble | | | |
| III-2 | 1 | Partly sol. partly gel | | | ~1 |
| III-3 | 2 | Partly sol. partly gel | | | ~1 |
| III-4 | 3 | Gel | 21.9 | 320 | 1.14 |
| III-5 | 5 | Gel | 23.4 | 360 | 1.01 |

Solubility data indicate that cross-link density increases with —NCO/—OH ratios of up to 3. Likewise, although comparatively good and desirable in ranges, the realized expansion is generally maximum when the involved —NCO/—OH ratio is at generally about, if not precisely 3.

Fourth Illustration

Excepting as otherwise here-specified as to certain particulars, the general procedure of the Second Illustration was employed to prepare and test the foaming behavior of a number of differing styrene-co-hydroxypropyl acrylate (HPA) products. The reaction in the mixing melt with "MONDUR MR" was done in each case for 8 minutes at 195° C.; and particle impregnation with 75/25 $CF_2Cl_2/CFCl_3$ blowing agent was at 80° C.

The results obtained, including the various compositions employed for each of the involved samples (as therein noted), were as set forth by the self-explanatory tabulations and graphical portrayals included in FIGS. 8 through 13, inclusive, of the accompanying Drawing. Comparative blank Sample No. 22-0 (an uncopolymerized polystyrene) represented in FIG. 12 was the same as the identically-numbered sample employed in the following Fifth Illustration hereof. In FIGS. 8–11 and 13, the small unidentified curve represents the foaming performance of a non-crosslinked blank for comparative purposes.

Fifth Illustration

The procedures of the First and Second Illustrations were repeated. A number of samples of hydroxylated styrene-co-hydroxyethyl methacrylate (HEMA) copolymer product were prepared, each of which had a physical weight of about 250 grams.

The several copolymer preparations made were composed according to the recipes given in the following Table IV.

TABLE IV

Composition of Copolymer Samples of Styrene (St)-Co-Hydroxyethyl Methacrylate (HEMA) Made with Benzoyl Peroxide ($Bz_2O_2$) Initiator

| Polymer No. | Composition (Wt. %) |
| --- | --- |
| 21-0 | 99.8 St + 0.2 $Bz_2O_2$ |
| 21-1 | 99.716 St + 0.084 HEMA + 0.2 $Bz_2O_2$ |
| 21-2 | 99.688 St + 0.112 HEMA + 0.2 $Bz_2O_2$ |
| 21-3 | 99.66 St + 0.140 HEMA + 0.2 $Bz_2O_2$ |

After being ground, the various polymer samples in individual portions were separately reacted for 8 minutes each after the polyisocyanate addition in a "Plastic-Corder" mixing unit according to the schedules list in the following Table V.

TABLE V

Polyisocyanate Reaction Conditions in Brabender Mixer of Various Copolymer Samples

| Sample No. | Polymer No. | "MONDUR MR" (—NCO/—OH) | Mixing Temperature (°C.) |
| --- | --- | --- | --- |
| 22-0 | 21-0 | — | 195 |
| 22-1 | 21-1 | 3 | 194 |
| 22-2 | 21-1 | 4 | 195 |
| 22-3 | 21-1 | 5 | 195 |
| 22-5 | 21-2 | 3 | 196 |
| 22-6 | 21-2 | 4 | 196 |
| 22-7 | 21-2 | 5 | 197 |
| 22-9 | 21-3 | 3 | 199 |
| 22-10 | 21-3 | 4 | 198 |
| 22-11 | 21-3 | 5 | 199 |

After the isocyanate-reaction hot-mixing of all of the Table V compositions, each of the resulting samples were found to be completely soluble in toluene.

All of the isocyanate-reacted samples described in Table V were pressurized with 75/25 $CF_2Cl_2/CFCl_3$ blowing agent (BA) containing an undetermined amount of water. One series, numerically listed without any suffix in the following Table VI (and in FIGS. 14, 15 and 16 of the Drawing), were made with no dibutyl tin dilaurate (T-12) added to the BA mixture. A second series, numerically listed with the capital "A" suffix in Table VI and FIGS. 14A, 15A and 16A of the Drawing, were prepared by pressuring with a BA mixture containing enough T-12 tin catalyst to provide about 0.1 weight percent of same in the impregnated polymer presuming all the involved T-12 permeated into the polymer with the BA. The solubility characteristics of the various BA-impregnated foamable samples were as set forth in the following Table VI. In FIGS. 15, 15A, 16 and 16A, the small unidentified curve represents the foaming behavior of an uncrosslinked polymer for comparative purposes.

TABLE VI

Solubility in Toluene of Various Blowing Agent (BA) - Impregnated Copolymer Samples

| Sample No. | Weight Percent BA Mixture | Toluene Solubility |
| --- | --- | --- |
| 22-0 | 28 | Soluble |
| 22-1 | 30 | Soluble |
| 22-1A | 27.2 | $W_g/W_s$ = 27.2 (gel) |
| 22-2 | 30 | Soluble |
| 22-2A | 30 | $W_g/W_s$ = 24.3 |
| 22-3 | 31 | Partial gel |
| 22-3A | 33 | $W_g/W_s$ = 22.4 (gel) |
| 22-5 | 33 | $W_g/W_s$ = 27.4 (gel) |
| 22-5A | 28.5 | $W_g/W_s$ = 23.3 (gel) |
| 22-6 | 28 | $W_g/W_s$ = 25.9 (gel) |
| 22-6A | 29 | $W_g/W_s$ = 23.8 (gel) |
| 22-7A | 29 | $W_g/W_s$ = 23.8 (gel) |
| 22-9 | 31 | $W_g/W_s$ = 23.8 (gel) |
| 22-9A | 28 | $W_g/W_s$ = 21.2 (gel) |
| 22-10 | 30 | $W_g/W_s$ = 25.7 (gel) |
| 22-10A | 29 | $W_g/W_s$ = 19.5 (gel) |

The foaming behavior of involved samples is illustrated in accompanying FIGS. 14, 15, 16, 14A, 15A and 16A of the accompanying Drawing, the first three demonstrating this with no T-12 in the samples and the last three doing the same with the tin catalyst contained in the tested samples of the foamable compositions.

From comparison of the representations in FIGS. 14, 15, 16, 14A, 15A and 16A, it is evident that utilization of a catalyst, such as the T-12 dibutyl tin dilaurate, is important for better foam behavior if the extent of hydroxylation in the base linear polymer is low, as when the content of copolymerized hydroxyethyl methacrylate (HEMA) in the styrene(co)HEMA materials was only about 0.084 weight percent. As is also evident, catalyst usage at higher hydroxylation levels in the non-cross-linked polymer is unnecessary—as when higher HEMA concentrations were involved in the tested styrene-co-HEMA materials. In fact and as is still further evident particularly from comprehension of FIG. 16A, catalyst usage for foamability enhancement actually tends to become undesirable when higher —NCO/—OH ratios are employed in the foam-providing compositions being made.

Sixth Illustration

A hydroxyl terminated polystyrene ($M_w$=162,000; $M_w/M_n$=1.17) was prepared according to the general reaction procedures wherein R is a difunctional organic radical:

Toluene + Styrene 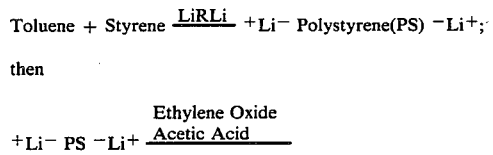 +Li⁻ Polystyrene(PS) ⁻Li⁺;

then

+Li⁻ PS ⁻Li⁺ 

HOCH₂CH₂—PS-CH₂CH₂—OH

The functional polymer thereby prepared, designated Sample VI-A, was precipitated by the addition of methanol and vacuum dried.

The following experiments were then conducted with Sample VI-A:

First, Sample VI-A, as obtained, was compression molded for 5 minutes into a 0.075 inch (ca. 0.189 cm) thick sheet, designated Sample VI-B; and Second, 20 percent of Sample VI-A was dissolved into methylene chloride and 4 —NCO equivalents/—OH (as "MONDUR MR-200") along with 0.1 percent dibutyl tin dilaurate (BOP) added. After drying overnight under vacuum, the compositions, designated Sample VI-C, were compression molded into 0.075 inch (ca. 0.189 cm) thick sheet for 5 minutes at 215° C.

The sheets were cut into 0.25 inch (ca. 0.635 cm) squares.

Equal parts of Samples VI-B and VI-C, respectively identified as Samples VI-1 and VI-3 and taken with no additional treatment, were placed in toluene at room temperature for 24 hours. Equal parts of Samples VI-B and VI-C, respectively identified as Samples VI-2 and VI-4, were placed in 84° C. H₂O for 17 hours prior to immersion in room temperature toluene.

The results were as set forth in the following tabulation.

TABLE VII

| Sample No. | Toluene Immersion Tests | | |
|---|---|---|---|
| | —NCO/—OH | H₂O Treatment | *Wg/Ws |
| VI-1 | 0 | No | Soluble |
| VI-2 | 0 | Yes | Soluble |
| VI-3 | 4 | No | 33.8 (firm gel) |
| VI-4 | 4 | Yes | 34.2 (firm gel) |

*Weight of swollen gel/initial polymer weight.

The swelling data obtained indicate that maximum crosslink density for Sample VI-3 was attained without water treatment. Gels of Samples VI-3 and VI-4 in toluene were isotropic with the initial moldings. Molded pieces of Samples VI-1, VI-2, combined, VI-3 and VI-4 (0.25"×0.25"×0.075") were coated with clay as an anti-fusion agent and pressurized in sealed ampoules for 18 hours at 85° C. with 75/25 CF₂Cl₂, CFCl₃ mixture. Pressurized samples were designated Samples VI-5 (VI-1 and VI-2), VI-6 and VI-7. Devolatilization for 2 hours at 175° C., and toluene immersion for 24 hours at room temperature provided the data in the following Table VIII.

TABLE VIII

| Properties of Polymer Compositions Impregnated with CF₂Cl₂/CFCl₃ Mixture | | |
|---|---|---|
| Sample No. | Wt % CF₂Cl₂/CFCl₃ | Wg/Ws (in Toluene) |
| VI-5 | 33.3 | Soluble |
| VI-6 | 32.3 | 34.3 firm gel |

TABLE VIII-continued

| Properties of Polymer Compositions Impregnated with CF₂Cl₂/CFCl₃ Mixture | | |
|---|---|---|
| Sample No. | Wt % CF₂Cl₂/CFCl₃ | Wg/Ws (in Toluene) |
| VI-7 | 31.3 | 48.7 soft gel |

As is evident, the water treatment appears to have reduced crosslink density. Samples VI-5, VI-6 and VI-7 were expanded to closed cell foams by heating to 130° C. in an air oven. Expansion vs. time data are plotted in FIG. 17 of the Drawing.

The effect of network formation of the proper crosslink density upon expansion and thermocollapse resistance of foamed polymer is clearly evident from comparison of non-crosslinked Sample VI-5 with crosslinked Samples VI-6 and VI-7. There is little effect of the water treatment until after prolonged heating at 130° C.

In connection with the above-demonstrated work employing the tin catalyst and notwithstanding the good results of same, there is abundant evidence that a post water treatment is much more desirable if no tin is used with other —OH functional compositions.

Seventh Illustration

A compolymer of ethylene (i.e., "E") with 0.114 percent hydroxyethyl acrylate was prepared by the conventional high pressure tubular process. The density of this polymer was 0.915 g/cm⁻³ and the melt flow index at 190° C. was 7.

The following experiments were conducted with this polymer.

(1) To obtain Sample VII-1, 44 grams of polymer (E+0.1114 percent HEA) was milled in a Brabender at 60 rpm with a 156° C. jacket temperature for 17 minutes. The resulting product was then cooled.

(2) To obtain Sample VII-2, 44 grams of the same polymer (E+0.1114 percent HEA) was milled in a Brabender (same condition as for Sample VII-1) for 14 minutes. There was then added 5 grams azobisformamide (i.e., "ABFA") powder with continued mixing for 3 minutes. The product was then cooled.

(3) To obtain Sample VII-3, 44 grams of the same polymer (E+0.1114 percent HEA) was milled in a Brabender (same conditions as for Sample VII-1) for 8 minutes. There was then added 0.202 gram "MONDUR MR" (3.5 —NCO/—OH) with continued milling for 9 additional minutes (total milling time 17 minutes). The product was also cooled.

(4) To obtain Sample VII-4, the same procedure as for Sample VII-3 was followed excepting that 5 grams of azobisformamide was added 3 minutes before the milling was terminated, after 17 minutes of milling.

Samples VII-1 and VII-3 were compression molded into thin films (0.01"×2"×3" or 0.0254 cm×5.08 cm×7.62 cm) for 5 minutes at 165° C.

Figure 18:
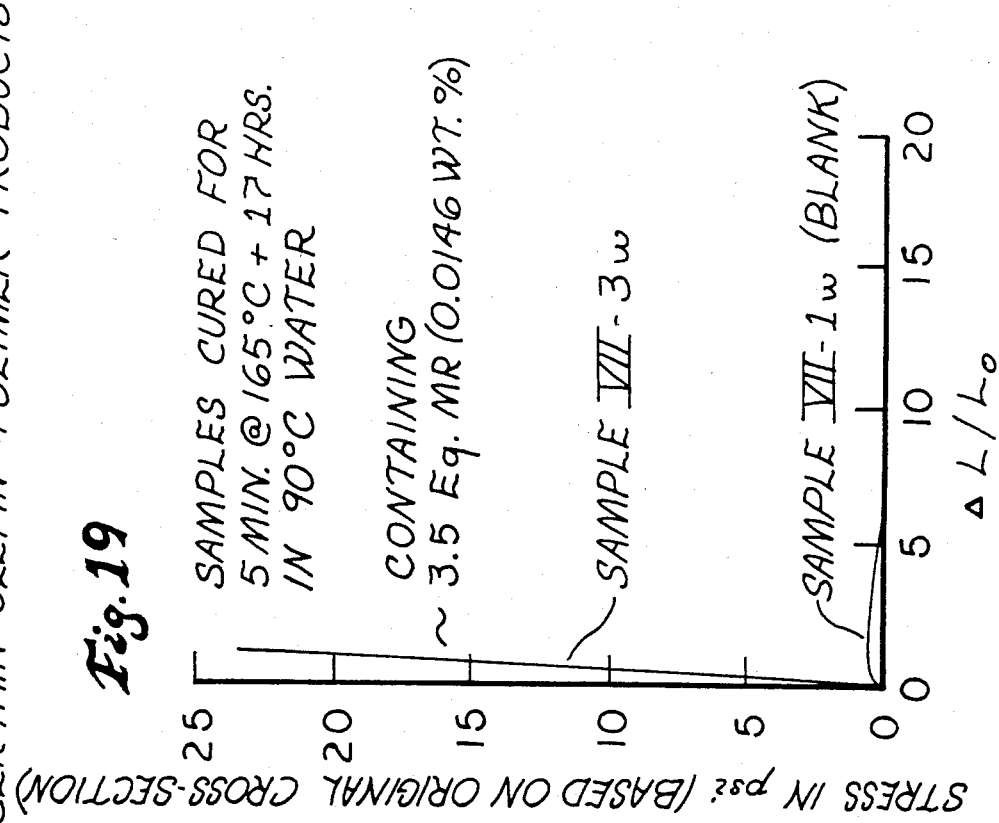

Stress-strain measurements of these films were made at 130° C. in N₂, i.e., 20° C. above the crystalline melting point of the polymer. The attached FIG. 18 clearly shows that the polymethylene polyphenylene polyisocyanate does react with E-0.1114% HEA copolymer and dramatically increases the rupture strength of the polymer.

Figure 19:
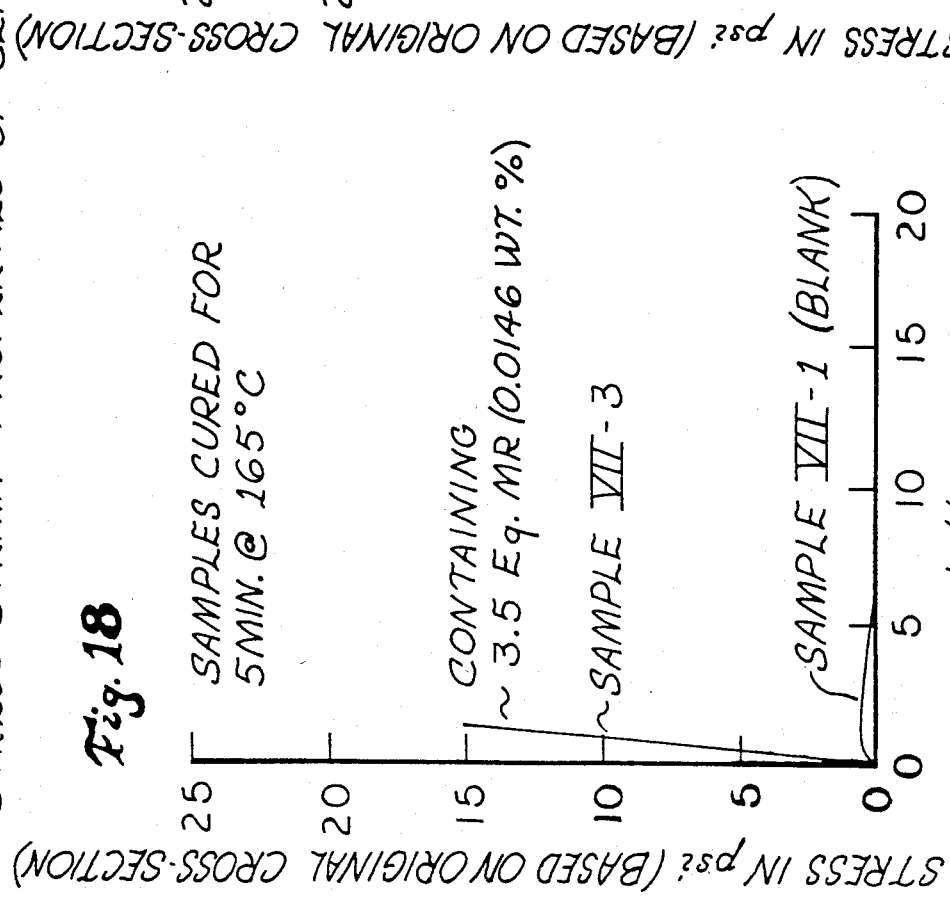

Other molded-film Samples VII-1$_w$ and VII-3$_w$ were immersed in 90° C. H₂O for 17 hours prior to measuring their stress-strain behaviors at 130° C. The water treatment clearly improved the strength of the isocyanate modified polymer Sample VII-3$_w$ but had no significant effect upon the original copolymer Sample VII-1$_w$. This is shown in FIG. 19 of the Drawing.

Samples VII-2 and VII-4 were compression molded into bars (0.125"×1"×2") for 5 minutes at 165° C.

The bars were immersed into molten "HITEC" (Registered Trade Mark) liquid salt (a potassium-nitrate-sodium-nitrite eutectic) at 225° C. for 3 minutes.

Sample VII-2 was a formless polymer mass after removal from the hot salt with little evidence of foaming. The thermosensitive ABFA blowing agent had decomposed to nitrogen and carbon dioxide gases, but the rheological properties of the polymer were unsuitable for thermostable foam.

Sample VII-4 produced a rectangular cellular product 0.325"×2.6"×5.4" (0.8255 cm×6.602 cm×13.716 cm). The volume of this foam was approximately eighteen times (18×) larger than the original solid. The cell structure had very good appearance and its average cell size diameter was about 1 mm.

Eighth Illustration

A styrene-acrylonitrile hydroxyethyl acrylate terpolymer was prepared by continuous polymerization of a monomer mixture in a recirculating coil polymerizer. The polymer composition was about 79.84 percent styrene, 19.96 percent acrylonitrile and 0.2 percent hydroxyethyl acrylate, all percentages being by weight. The polymer had $M_n$ of 80,000 $M_w$ of 175,000 and $M_w/M_n$ of 2.19 as determined by gel permeation chromatography.

A sample VIII-1 was obtained by milling in a Brabender at 60 rpm with a jacket temperature of about 180° C. for 17 minutes.

A sample VIII-2 was obtained by milling as Sample VIII-1 with the exception that 4 —NCOequivalents/—OH were added 8 minutes after milling had commenced.

Both samples were ground, molded and impregnated with a blowing agent which was a 50:50 mixture of dichlorodifluoromethane and trichlorofluoromethane at a temperature of 120° C. and stored for one day at a temperature of −18° C. in the manner hereinbefore described. Sample VIII-1 contained about 26.8 weight percent blowing agent and Sample VIII-2 about 24.3 weight percent blowing agent. The samples were evaluated for foaming characteristics in an air oven at 130° C. The time-foam volume relationship for samples VIII-1 and VIII-2 were generally as curves 1 and 3 of FIG. 7, respectively, wherein the maximum volume for sample VIII-1 was about 30 volumes and for sample VIII-2 about 200 volumes.

Analogous good results are obtained when the procedures of the foregoing Illustrations are repeated excepting to utilize other fundamental sparsely-hydroxylated alkenyl aromatic and other olefin copolymer constituents and other polyisocyanate reactants within the delineated scope of the invention, as well as other blowing agent materials and catalyst ingredients (when and where beneficial) in the foaming operations.

Excellent quality product in sheet, film or other extruded shaped article form is also obtained when the isocyanate-reacted, polystyrenic polyphenol and other hydroxylated olefin polymer products of the foregoing Illustrations, or compositions analogous thereto, are prepared with or without utilization of a blowing agent and extruded into a steam or other moisture laden atmosphere or in an equivalent ambiance capable of providing surroundings rich in HOH content.

Practice of the present invention facilitates extrusion of expandable plastic particles containing volatile organic blowing agents for production of many cushioning and low density packaging foam products. The enhanced thermocollapse resistance of foams made pursuant to the invention tends to simplify the extrusion manufacture of various foam shapes in minimizing cooling requirements for the involved polymer/blowing agent gel phase prior to actual extrusion through a die or other shaping device.

Many changes and modifications are possible to readily make and adapt in practice of the present invention without substantial or material departure from its essential spirit and scope, all in keeping with same as it is presented in the claims hereto-appended.

What is claimed is:

1. A lightly cross-linked expanded foam product of the composition comprising, in intimate admixture: (a) as a fundamental constituent, a hydroxylated, normally solid, linear polymer selected from the group consisting of linear olefin polymers, linear alkenyl aromatic copolymers, which is a polymerizate containing at least about 60 percent by weight, based on total polymer weight (i.e., "weight percent") of at least one polymerizable monomer of the general Formula:

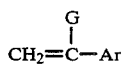

wherein: G is selected from the group consisting of hydrogen and methyl; and Ar is an aromatic radical, including alkyl and halo-ring-substituted aromatic units, that contains from 6 to about 10 carbon atoms; with the balance being copolymerized units of another addition polymerizable monomer or monomer mixture that is copolymerizable with styrene, the copolymer having a hydroxyl functionality of from 2 to 6 average hydroxyl groups per unit weight average molecule; and (b) a substantially minor proportion of an inter-reactive crosslinking polyisocyanate constituent, with the further limitation that the copolymer have a crosslinking coefficient of from about 0.8 to about 3 which results in a visually detectable gel in a solvent which dissolves the corresponding non-crosslinked hydroxylated polymers, and that such composition on incorporation of a blowing agent therein is foamable to a thermal collapse resistant thermoplastic foam.

2. The foamed product of claim 1 wherein the composition is a lightly cross-linked polymeric network product of reaction in the melt from a molten composition in accordance with that of claim 1 wherein the cross-linking coefficient ("δ") value representing the number of cross-links per weight average molecule in the composition is between about 0.8 and about 3.

* * * * *